(12) United States Patent
Saint

(10) Patent No.: US 11,627,840 B2
(45) Date of Patent: Apr. 18, 2023

(54) SKIMMER LADLE

(71) Applicant: Al Saint, Daytona Beach, FL (US)

(72) Inventor: Al Saint, Daytona Beach, FL (US)

( * ) Notice: Subject to any disclaimer, the term of this patent is extended or adjusted under 35 U.S.C. 154(b) by 18 days.

(21) Appl. No.: 17/387,043

(22) Filed: Jul. 28, 2021

(65) Prior Publication Data

US 2023/0030434 A1    Feb. 2, 2023

(51) Int. Cl.
*A47J 43/28* (2006.01)

(52) U.S. Cl.
CPC .................. *A47J 43/285* (2013.01)

(58) Field of Classification Search
CPC ......... A47J 43/28; A47J 43/284; A47J 43/285
See application file for complete search history.

(56) References Cited

U.S. PATENT DOCUMENTS

| | | | | |
|---|---|---|---|---|
| 1,057,269 A * | 3/1913 | Prestien | ................. | B26B 11/00 30/325 |
| 1,334,169 A * | 3/1920 | Royer | ................... | A47G 21/04 209/418 |
| 1,367,568 A * | 2/1921 | Smith | ................... | A47G 19/16 99/323 |
| 1,470,199 A * | 10/1923 | Small | ..................... | A47J 27/13 220/23.88 |
| 1,474,443 A * | 11/1923 | Rhyne | ................... | A61J 7/0046 30/326 |
| 1,530,586 A * | 3/1925 | Wack | ...................... | A47J 19/06 100/234 |
| 1,555,502 A * | 9/1925 | Knoblauch | ............ | A47G 21/04 30/325 |
| 1,648,906 A * | 11/1927 | Lubrano | ................ | A47G 19/16 30/325 |
| 1,654,980 A * | 1/1928 | Le Duc | .................. | A47G 21/04 210/469 |
| 1,677,120 A * | 7/1928 | Rudin | ................... | A47J 43/281 30/325 |
| 1,759,512 A * | 5/1930 | Kramer | ................... | A47J 43/14 99/500 |
| 2,092,878 A * | 9/1937 | Hess | ..................... | A47J 43/281 30/142 |
| 2,143,782 A * | 1/1939 | Lewy | .................... | A47J 43/285 30/325 |
| 2,396,943 A * | 3/1946 | Frank | .................... | A61J 7/0023 73/429 |

(Continued)

*Primary Examiner* — Kenneth E Peterson
*Assistant Examiner* — Richard D Crosby, Jr.
(74) *Attorney, Agent, or Firm* — A. Sumshkovich

(57) ABSTRACT

A ladle, for filtering a mixture containing debris, includes an outer bowl defining outer holes and an upper edge, a handle attached thereto, an inner bowl disposed within the outer bowl forming a gap therebetween and having ether inner holes or protrusions separated by grooves disposed below the upper edge and above the outer holes, several holders joining the outer and inner bowls in the upper region thereof, and inner and outer outlet spouts coaxially provided in the upper regions of the bowls for pouring out the filtered mixture from the ladle. The holders can be made as spring-loaded brackets or latches preferably having a U-loop shape placed over the upper edges of the bowls, providing for a removable attachment of the bowls. Optionally the holders can be made as rivets or screws joining the bowls in the upper regions thereof, providing for a fixed attachment of the bowls.

8 Claims, 7 Drawing Sheets

(56) References Cited

U.S. PATENT DOCUMENTS

| | | | | |
|---|---|---|---|---|
| 2,484,461 A * | 10/1949 | Perry, Jr. | A47G 21/106 | 100/234 |
| 2,522,343 A * | 9/1950 | Canfield | A47J 43/22 | 209/357 |
| 2,537,848 A * | 1/1951 | Novion | A47J 43/285 | 210/470 |
| 2,570,521 A * | 10/1951 | Chester | G01F 19/002 | 99/323 |
| 2,650,425 A * | 9/1953 | Brandel | A47J 43/281 | 30/325 |
| 2,887,948 A * | 5/1959 | Kramer | A47G 21/106 | 294/7 |
| 2,994,320 A * | 8/1961 | Poschadel | A47J 45/10 | 220/628 |
| 3,149,824 A * | 9/1964 | Albano | A47J 43/281 | 366/144 |
| 3,326,384 A * | 6/1967 | Wessels | A47J 43/284 | 210/470 |
| 3,354,812 A * | 11/1967 | Gorton, Jr. | A47G 19/16 | 99/323 |
| 3,755,895 A * | 9/1973 | Claasen | A47J 43/281 | 30/326 |
| 3,822,020 A * | 7/1974 | Hong | A47J 43/281 | 248/167 |
| 3,886,345 A * | 5/1975 | Baisch | A47J 43/281 | 219/533 |
| 3,946,652 A * | 3/1976 | Gorin | A47G 19/16 | 426/77 |
| 4,005,310 A * | 1/1977 | Baisch | H05B 3/80 | 425/282 |
| 4,043,039 A * | 8/1977 | Goetze, Jr. | A47J 43/283 | 30/325 |
| D293,408 S * | 12/1987 | Hansen | D7/691 | |
| 4,825,551 A * | 5/1989 | Sherblom | A47J 43/281 | 30/325 |
| 5,084,177 A * | 1/1992 | Keene | B01D 17/0214 | 99/496 |
| 5,182,860 A * | 2/1993 | Kuhlman | A47J 43/285 | 30/325 |
| 5,199,349 A * | 4/1993 | Hansen | A47J 43/284 | 30/325 |
| 5,367,775 A * | 11/1994 | Tong | A47J 43/285 | 30/326 |
| 5,510,028 A * | 4/1996 | Kuhlman | A47J 43/284 | 99/496 |
| 5,560,109 A * | 10/1996 | Lam | A47J 43/284 | 30/325 |
| 6,126,018 A * | 10/2000 | Cone | B01D 29/35 | 210/474 |
| 6,135,307 A * | 10/2000 | Fahy | A47G 19/02 | 220/636 |
| 6,520,383 B1 * | 2/2003 | Brest | A47J 36/14 | 222/572 |
| 6,550,146 B1 * | 4/2003 | Rouleau | A47J 43/285 | 30/325 |
| 6,675,482 B1 * | 1/2004 | Gilbert, Jr. | A61J 7/0053 | 222/258 |
| 6,722,043 B2 * | 4/2004 | Teng | A47J 43/285 | D7/691 |
| 6,869,531 B2 * | 3/2005 | Chiang | B01D 17/10 | 99/496 |
| 6,925,686 B2 * | 8/2005 | Heathcock | B25G 1/04 | 16/427 |
| 7,090,269 B2 * | 8/2006 | Kelsey | A47J 43/283 | 294/16 |
| 7,356,933 B2 * | 4/2008 | Wong | A47J 43/288 | 30/325 |
| 7,416,361 B1 * | 8/2008 | Ostrobrod | A46B 11/06 | 16/427 |
| D607,287 S * | 1/2010 | Beasley | D7/674 | |
| D649,415 S * | 11/2011 | Williams | D7/667 | |
| 8,381,640 B1 * | 2/2013 | Wilson | A47J 27/002 | 99/413 |
| 9,918,591 B2 * | 3/2018 | Sargent, III | A47J 43/285 | |
| 10,091,948 B2 * | 10/2018 | Pringnitz | B25G 1/04 | |
| 2003/0188439 A1 * | 10/2003 | Teng | A47J 43/285 | 30/324 |
| 2004/0079697 A1 * | 4/2004 | Chiang | B01D 17/00 | 210/464 |
| 2004/0250876 A1 * | 12/2004 | Cornfield | A47J 43/281 | 141/110 |
| 2005/0230326 A1 * | 10/2005 | Cooper | A47J 43/285 | 210/776 |
| 2006/0174494 A1 * | 8/2006 | Wong | A47J 43/288 | 30/325 |
| 2006/0254976 A1 * | 11/2006 | Cooper | A47J 36/20 | 210/470 |
| 2007/0186779 A1 * | 8/2007 | Fung | A47G 19/16 | 99/275 |
| 2007/0262089 A1 * | 11/2007 | LeGreve | A47G 19/34 | 222/189.02 |
| 2009/0255417 A1 * | 10/2009 | Smith | A47J 43/284 | 99/516 |
| 2010/0001007 A1 * | 1/2010 | Ferraro | A47J 43/22 | 220/23.88 |
| 2012/0097673 A1 * | 4/2012 | McDonald | B65D 81/3288 | 220/737 |
| 2014/0033545 A1 * | 2/2014 | Dunbar, Jr. | A47J 43/281 | 30/325 |
| 2014/0183203 A1 * | 7/2014 | Curtis | A47J 43/24 | 220/694 |
| 2015/0099044 A1 * | 4/2015 | Bowa | B65D 81/261 | 426/397 |
| 2016/0073827 A1 * | 3/2016 | Katsu | A47J 43/24 | 210/473 |
| 2019/0021552 A1 * | 1/2019 | Hon | A47J 43/28 | |

* cited by examiner

SKIMMER LADLE

TECHNICAL FIELD

The present invention relates to kitchen utensil, specifically to a cookware class for broth extracting ladles.

BACKGROUND OF THE INVENTION

Prior art describes several types of ladles. Particularly, U.S. Pat. No. 6,722,043, hereby entirely incorporated by reference, discloses "a kitchen fat-skimming ladle", which "comprises of a handle, a container bowl, a conduit that drains from an inlet located at the interior bottom of the container to an outlet located behind the handle at its proximal end. This utensil uses the effective bottom draining principle of a common gravy skimmer and returns liquid stock to the pot while leaving fat behind for disposal. This ladle avails the entire brim of the ladle bowl to be used for scooping out the soup stock mixture enabling very natural handling. The liquid stock can be drained back into the pot easily by tipping the ladle backwards leaving fat behind. The conduit merges with the retainer bowl and handle, and is completely hidden from view. This dual-purpose ladle has the same simple elegant look and easy functioning of a common soup ladle."

In the other words: the broth is drained through the ladle into the pot, whereas the fat remains in the container bowl. In order to operate the above described ladle, the person should position his/her hand at a certain angle to provide necessary draining of the broth through the conduit. Then the person has to dispose of the fat remaining in the bowl.

Another U.S. Pat. No. 5,560,109, incorporated by reference herein, describes "apparatus for separating a liquid from a floating component, comprising first and second liquid receiving vessels, said first liquid receiving vessel being received within said second liquid receiving vessel, said first liquid receiving vessel having a hole at a base region thereof through which liquid received in said first liquid receiving vessel in use may flow into said second liquid receiving vessel from which said liquid may then be poured . . . . Such liquid will be pure liquid and the unwanted component will remain in the first vessel. The apparatus is preferably in the form of a spoon, but could also be in the form of a cup, jug, glass or the like."

Thus, the purified soup is poured from the second vessel, and the unwanted component (mostly fat) remains in the first vessel. To provide more or less efficient operation, the invention proposes that "preferably the first liquid receiving vessel is mounted for rotation relative to the second liquid receiving vessel, whereby when the second vessel is tilted to pour liquid therefrom, the first vessel remains horizontal and liquid in the first vessel does not escape into the second vessel other than by means of the hole." Again, after the purified soup has been poured from the second vessel, the first vessel has to be cleaned from the remaining unwanted component.

OBJECT AND SUMMARY OF THE INVENTION

The present invention allows to separate a mixture (e.g. soup in a pot) containing undesirable components (e.g., fat particles, floating debris, etc.) to get a substantially filtered mixture. On the other hand, it provides a novel functionality eliminating the need to dispose of the undesirable components after each scoop of the mixture made by the user. Therefore, the inventive ladle is so structured that permits separating the filtered mixture (e.g., broth) from the undesirable components, which components substantially remain in the mixture (e.g., in the pot containing soup).

A first embodiment of the inventive ladle comprises: an outer bowl with a number (preferably a plurality) of outer holes of predetermined sizes and shapes provided preferably in the bottom region thereof (bottom holes), and/or in the middle region thereof (sidewall holes); a handle for holding the outer bowl by the user attached to the outer bowl; an inner bowl disposed within the outer bowl so that a predetermined gap is provided therebetween. In its upper region, the inner bowl is provided with a number (preferably a plurality) of inner holes. In the region of its upper edge, the inner bowl is supplied with a number of holders (preferably spring-loaded brackets or latches, preferably having a U-loop shape) disposed in such a way that joining (embracing) the upper region of the outer bowl and the upper region of the inner bowl thereby allowing the outer bowl to support the inner bowl therein during operation. Optionally, the outer bowl can be made of mesh with predeterminedly small cells to filter out small debris of the mixture.

The inner bowl is preferably removably attached to the outer bowl, using the aforementioned loop-shape holders, which facilitates the cleaning of the inner and the outer bowls. In other design options of the first embodiment, the inner bowl may be fixedly attached to the outer bowl, for example, by a number of rivets or screws disposed in the upper regions of the bowls. The inner bowl can be provided with an inner outlet spout to ease the pouring out of the filtered mixture therefrom. For the same reason, the outer bowl can be provided with an outer outlet spout preferably positioned coaxially with the inner outlet spout. The axis of the outlet spouts can be positioned diametrically opposite to the axis of the handle or at any convenient angle thereto (e.g. 90 degrees, as shown in FIG. 3a), at a designer's choice.

A second embodiment of the inventive ladle comprises: an outer bowl with a number (preferably a plurality) of holes of predetermined sizes and shapes provided preferably in the bottom region thereof (bottom holes), and/or in the middle region thereof (sidewall holes); a handle attached to the outer bowl for holding the outer bowl by the user; an inner bowl disposed within the outer bowl so that a predetermined gap is provided therebetween. In its upper region, the inner bowl has a plurality of protrusions respectfully separated by a plurality of grooves. At least some of the protrusions are supplied with holders (preferably spring-loaded brackets or latches, preferably having a shape of U-loop) joining (embracing) an upper region of the outer bowl and an upper region of the inner bowl, thereby allowing the outer bowl to support the inner bowl therein during operation; the lower edges of the grooves are disposed predeterminedly below the upper edge of the outer bowl and predeterminedly above the holes of the outer bowl. The inner bowl is preferably made removably attached to the outer bowl, using the aforementioned holders, which facilitates the cleaning of the inner and outer bowls.

In other design options of the second embodiment, the inner bowl may be fixedly attached to the outer bowl, for example by a number of rivets or screws joining the outer bowl with the inner bowl in the upper regions of the bowls. The inner bowl can be provided with an inner outlet spout that may preferably be conjugated with one of the grooves to ease the pouring out of the filtered mixture from the inner bowl. For the same reason, the outer bowl can be provided with an outer outlet spout preferably positioned coaxially with the inner outlet spout. The axis of the outlet spouts can be positioned diametrically opposite to the axis of the handle or at any convenient angle (e.g. 90 degrees as shown in FIG. 3a) thereto, at a designer's choice. Optionally, the outer bowl can be made of mesh with predeterminedly small cells to filter out small debris of the mixture.

DESIGN OF PREFERRED EMBODIMENTS OF THE PRESENT INVENTION

Figure 1A:
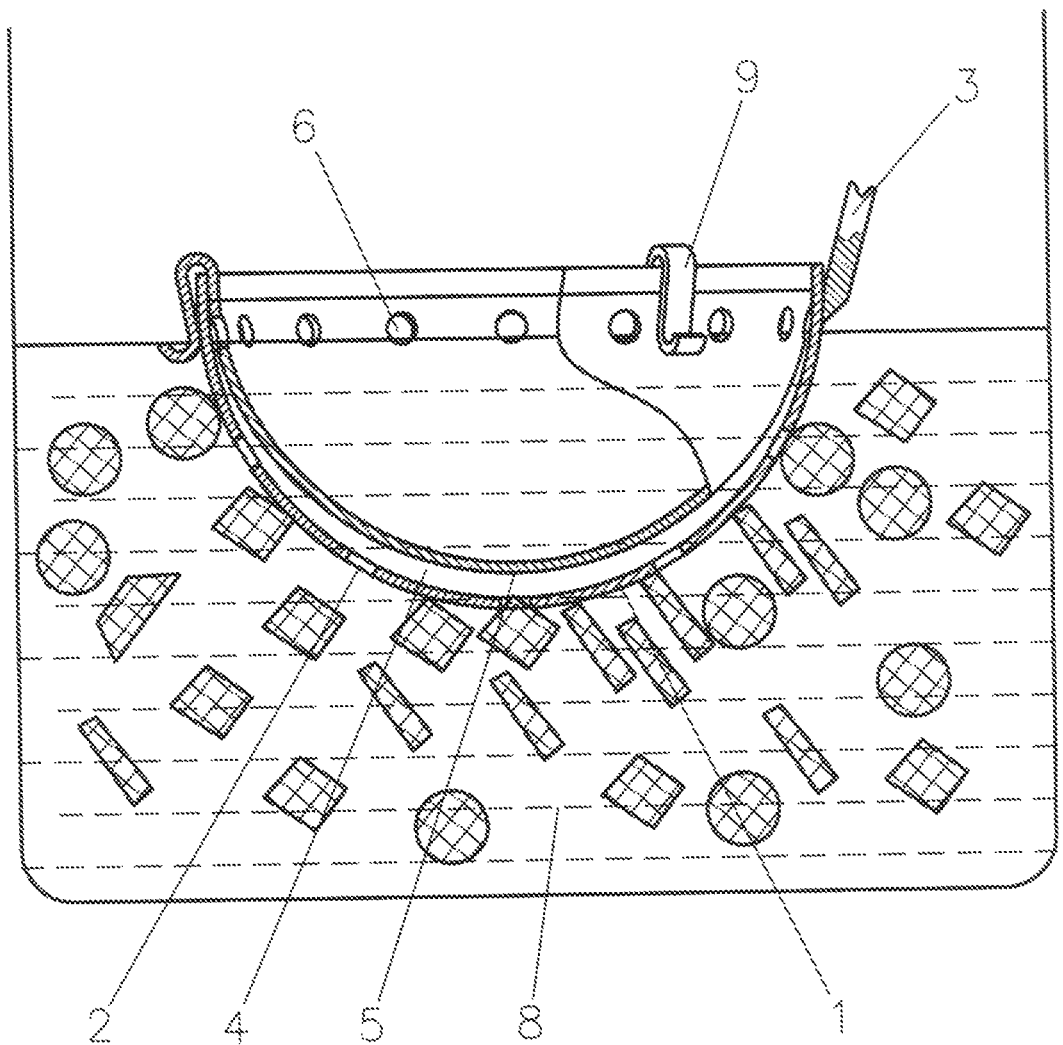
FIG. 1a illustrates a sectional view of a first embodiment of the inventive ladle submerged into a mixture.
Figure 1B:
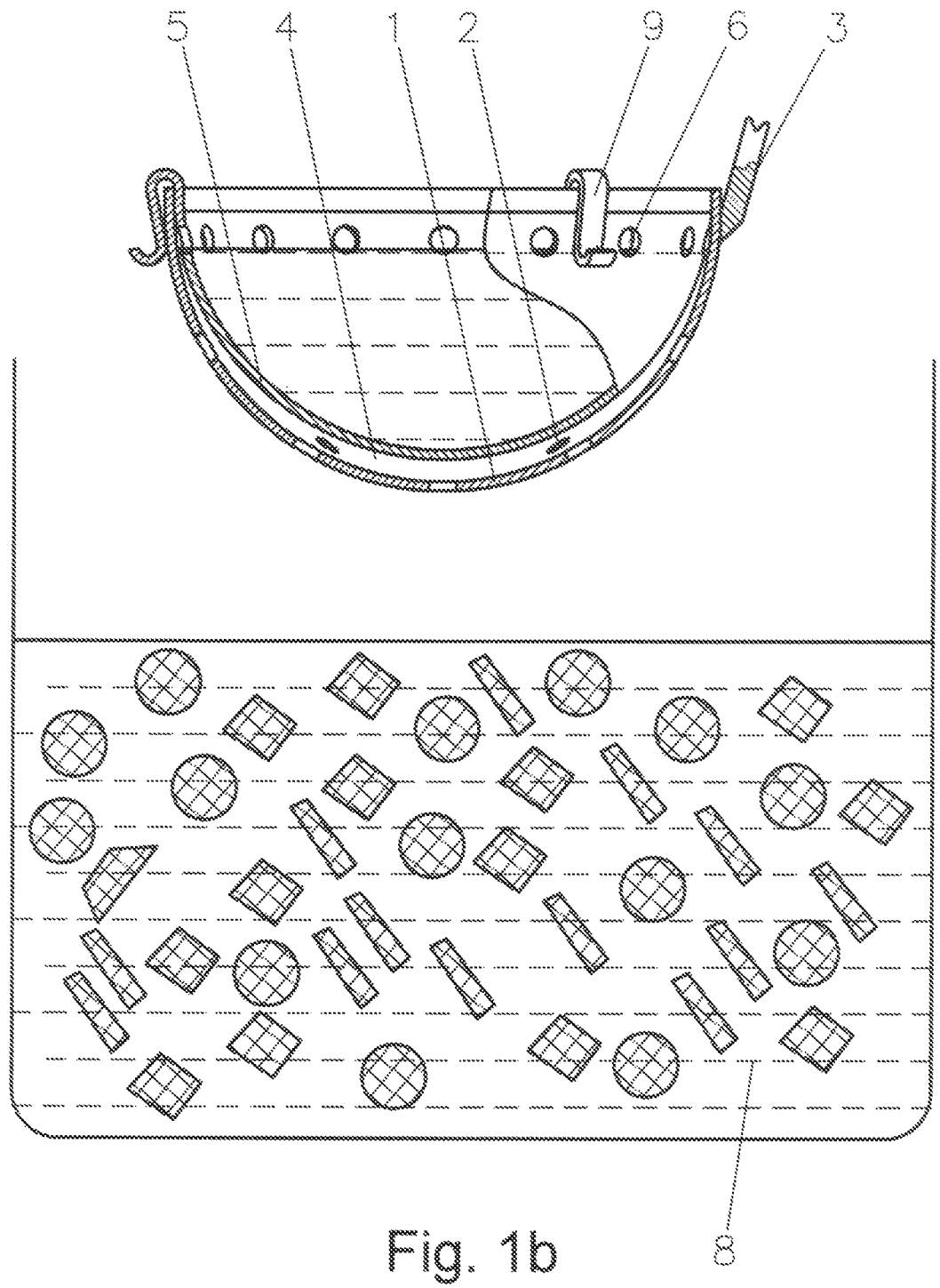
FIG. 1b illustrates a sectional view of the embodiment shown in FIG. 1a, wherein the ladle is pulled out of the mixture.
Figure 2:
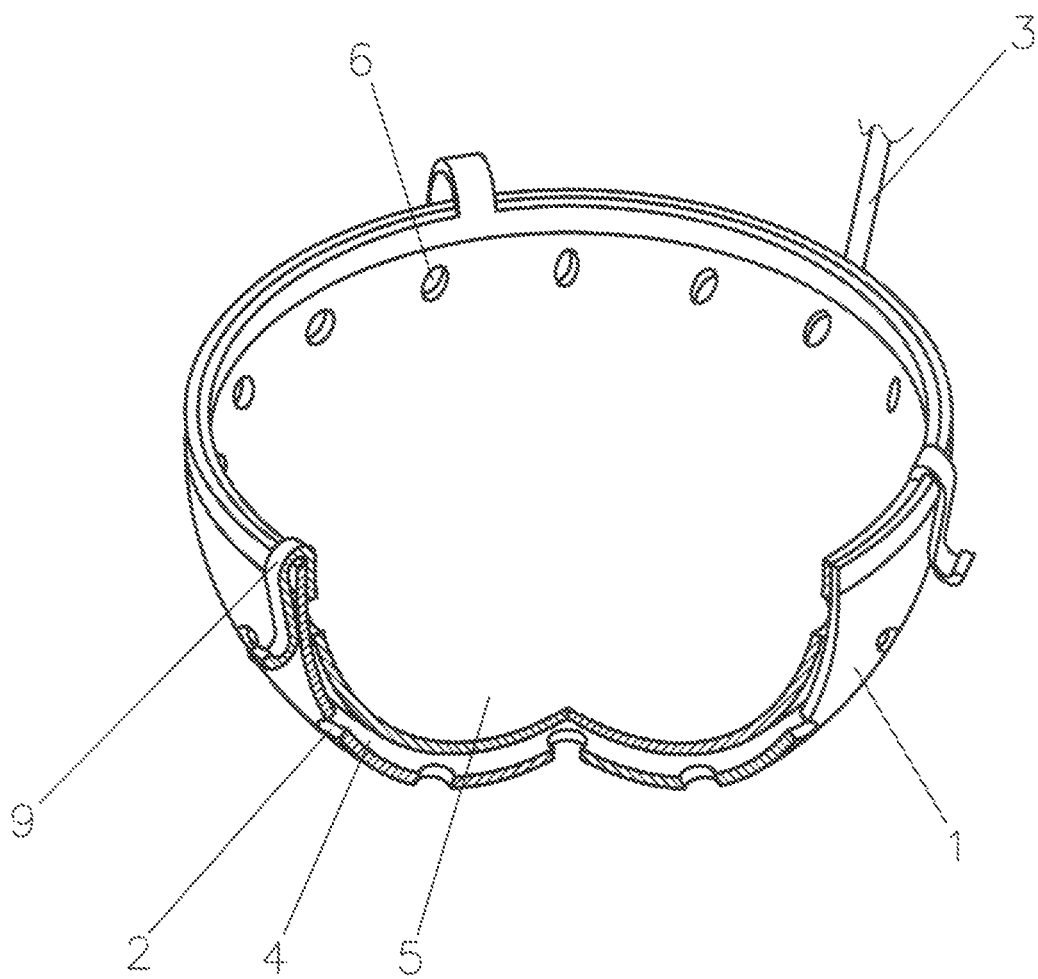
FIG. 2 illustrates an exploded (isometric) view of the first embodiment shown on FIGS. 1a and 1b.

While the invention may be susceptible to embodiment in different forms, there is shown in the drawings, and will be described in detail herein, specific embodiments of the present invention, with the understanding that the present disclosure is to be considered an exemplification of the principles of the invention, and is not intended to limit the invention to that as illustrated and described herein.

The first preferred embodiment of the present invention is illustrated on FIGS. 1a, 1b, 2, and 4. According to the first embodiment, the inventive ladle comprises: an outer bowl 1 with a number of outer holes 2 provided in the bottom region thereof (bottom holes 2b shown in FIG. 4), and/or in the middle region thereof (sidewall holes 2s shown in FIG. 4); a handle 3 for holding the outer bowl 1 by the user and submerging the outer bowl 1 into a mixture 8; the handle 3 is attached to the outer bowl 1; an inner bowl 5 disposed within the outer bowl 1 so that a predetermined gap 4 is provided therebetween. In its upper region, the inner bowl 5 is provided with a plurality of inner holes 6 disposed predeterminedly below the upper edge of the outer bowl 1 and predeterminedly above the outer holes 2. The ladle is supplied with a number of holders 9 (preferably having a shape of U-loop) disposed in such a way that joining the upper region of the outer bowl 1 and the upper region of the inner bowl 5, thereby allowing the outer bowl 1 to support the inner bowl 5 therein during operation. The inner bowl 5 is provided with an inner outlet spout 10b and the outer bowl 1 is provided with an outer outlet spout 10a disposed coaxially with the inner outlet spout 10b (as shown in FIG. 3a), to ease the pouring out of the filtered mixture from the ladle.

The inventive ladle can have a circular shape, an oval shape, or another convenient shape at a designer's choice. The size and shape of the holes 2 (2b, 2s) may be chosen considering most efficient filtering of any undesirable components, so that the undesirable components remain outside of the outer bowl 1 when it's submerged into the mixture 8. In certain design options, an additional cover (not shown) may be placed over an external surface of the outer bowl, which cover may be made of suitable filtering materials. It is possible to use a number of interchangeable outer bowls 1 with different shapes and sizes of the holes 2 in combination with, for example, one inner bowl 5, and vice-versa.

Figure 3:
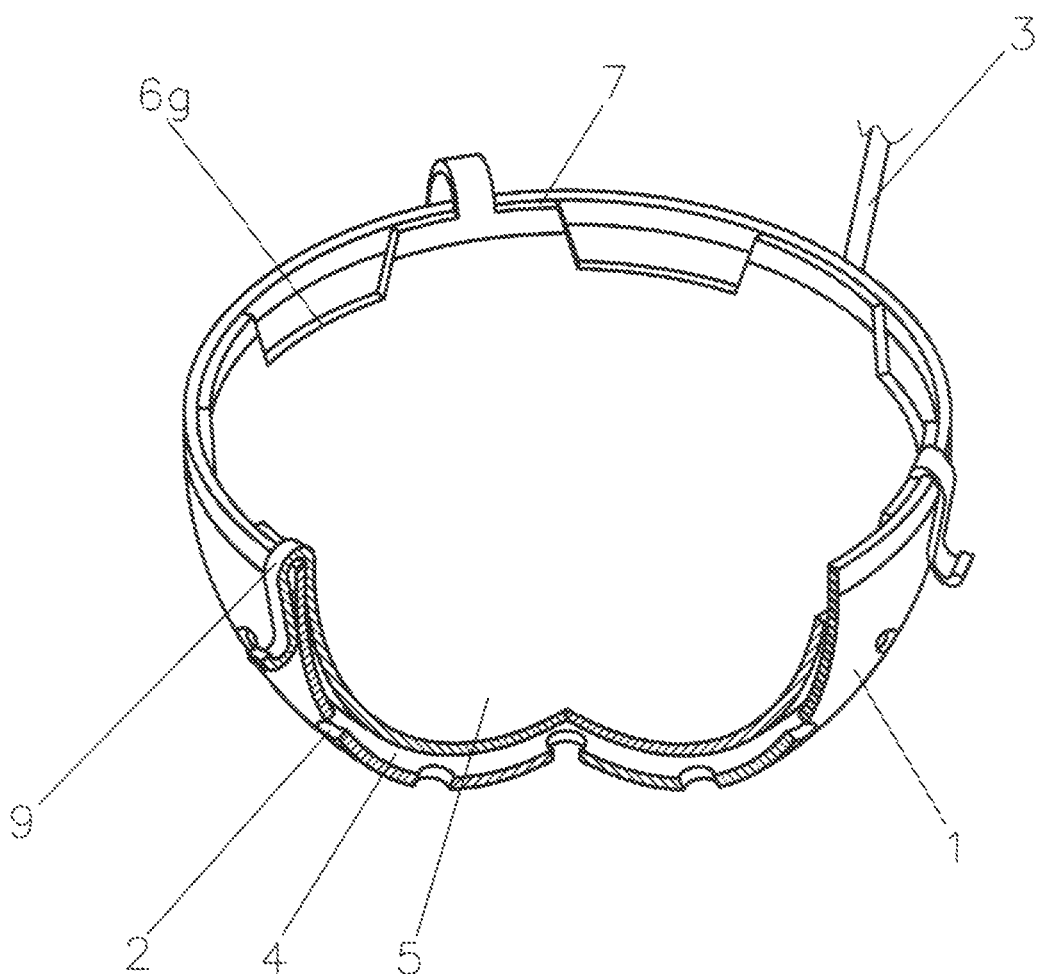
FIG. 3 illustrates an exploded (isometric) view of a second embodiment of the inventive ladle.
Figure 3A:
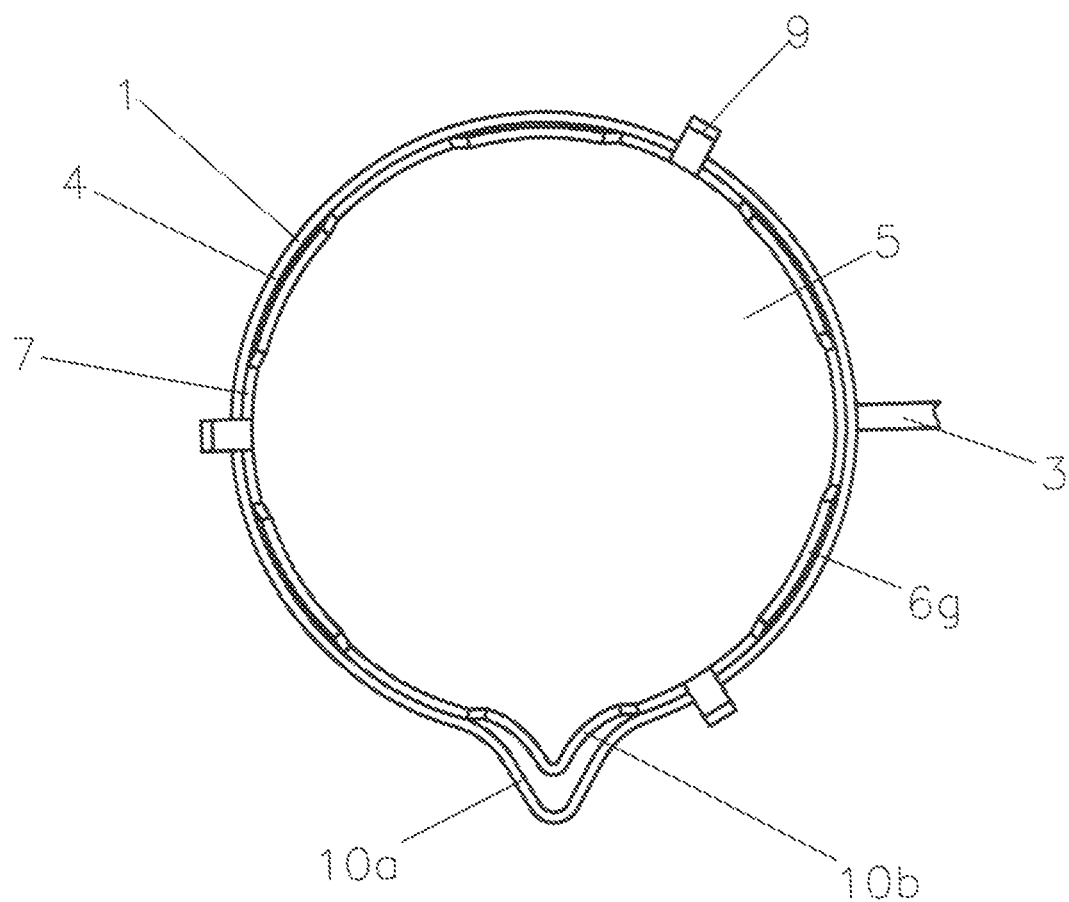
FIG. 3a illustrates a plan projection view of the second embodiment of the inventive ladle.
Figure 3B:
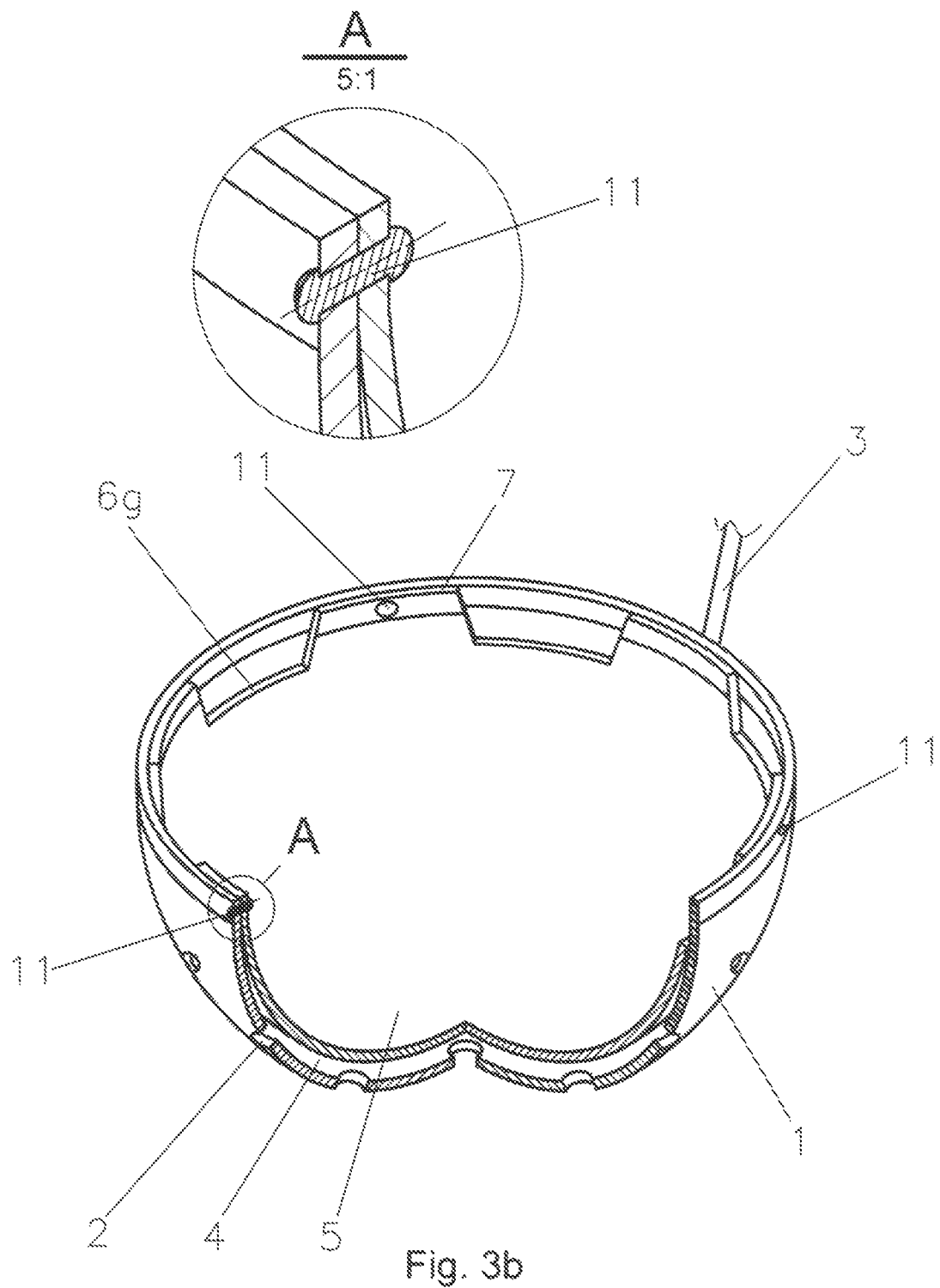
FIG. 3b illustrates an exploded (isometric) view of another design option of the second embodiment of the inventive ladle.
Figure 4:
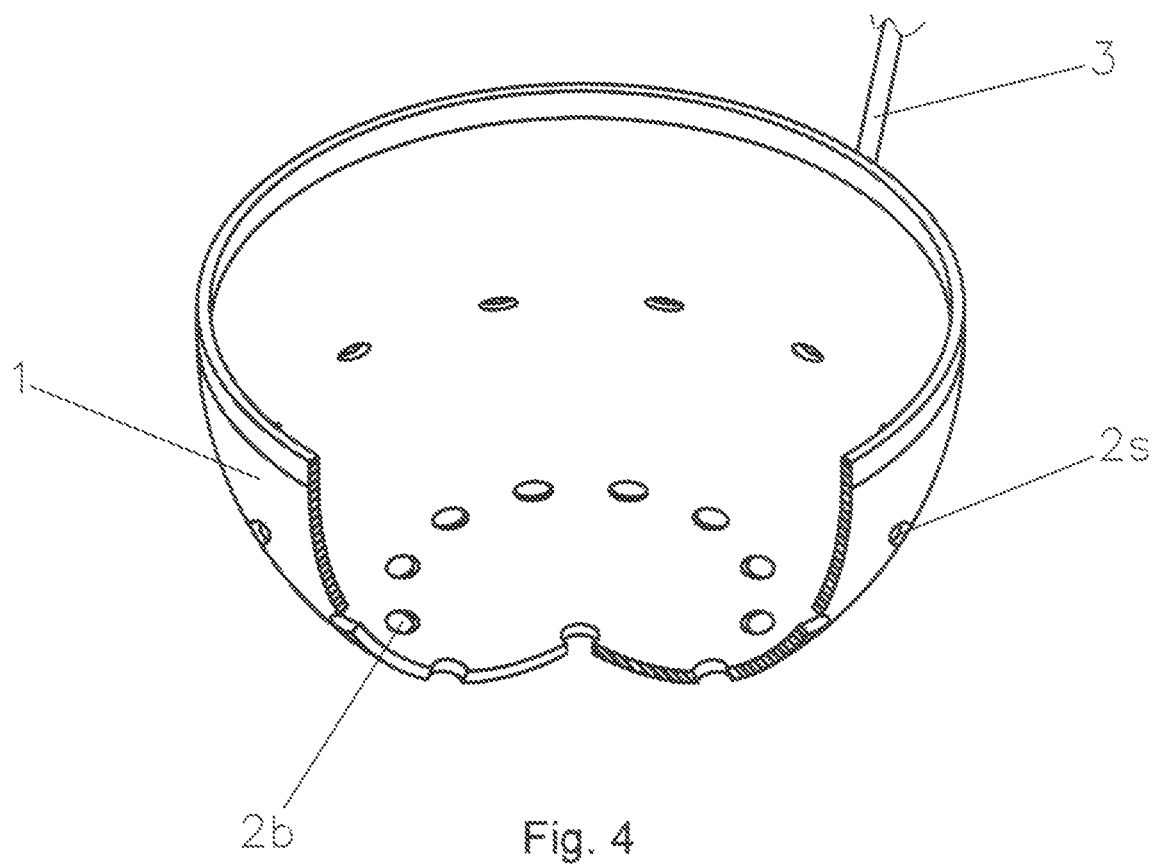
FIG. 4 illustrates an exploded (isometric) view of another design option of the first embodiment of the inventive ladle.

The second preferred embodiment of the present invention is illustrated on FIGS. 3, 3a and 3b. According to the second embodiment, the inventive ladle comprises: an outer bowl 1 with a number of holes 2 provided in the bottom region thereof (bottom holes 2b shown in FIG. 4), and/or in the middle region thereof (sidewall holes 2s shown in FIG. 4); a handle 3 attached to the outer bowl 1 for holding the outer bowl by the user; an inner bowl 5 disposed within the outer bowl 1 so that a predetermined gap 4 is provided therebetween. In its upper region, the inner bowl 5 has a plurality of protrusions 7 respectively separated by a plurality of grooves 6g. At least some of the protrusions 7 each is supplied with a holder 9 preferably having a U-loop shape, and joining the outer bowl 1 with the inner bowl 5 in the upper regions thereof, thereby allowing the outer bowl 1 to support the inner bowl 5 therein during operation. The lower edges of the grooves 6g are disposed predeterminedly below the upper edge of the outer bowl 1, but predeterminedly above the holes 2 of the outer bowl 1. The inner bowl 5 is provided with an inner outlet spout 10b (shown in FIG. 3a) conjugated with one of the grooves 6g, and the outer bowl 1 is provided with an outer outlet spout 10a (shown in FIG. 3a), coaxially disposed with the inner outlet spout 10b, to ease the pouring out the filtered mixture from the inner bowl 5. In other design options of the second embodiment, the inner bowl 5 may be fixedly attached to the outer bowl, for example, by a number of rivets 11 or screws joining the outer bowl 1 with the inner bowl 5 in the upper regions of the inner and upper bowls.

EXEMPLARY OPERATION OF AN EMBODIMENT OF THE INVENTION

An example of operation of the second embodiment depicted on FIGS. 3 and 3a follows. The ladle is submerged into a pot with mixture 8 containing undesirable components (e.g., fat, debris, sediments), so that the lower edges of grooves 6g are positioned below the surface level of mixture 8. The mixture 8 flows through the outer holes 2 of the bowl 1 into the gap 4, elevates to the level of the lower edges of grooves 6g, and through the grooves 6g flows into the inner bowl 5, until fills it up to the surface level of mixture 8 in the pot. While flowing through the holes 2, the undesirable components are caught by the outer holes 2, which undesirable components are filtered out and remain outside of the outer bowl 1, whereas the substantially filtered mixture is collected inside the inner bowl 5. Thusly, the user pours the filtered mixture out by a natural hand movement, for example into a plate. The user may scoop as many bowls of broth as he/she wants, and does not need to clean the bowls after each scoop from the undesirable components, saving time.

The structural principle disclosed above may also be applied to other devices, for example, intended to get more or less purified water from various sources, or to get a filtered fraction of other liquids containing certain kinds of impurities. External filter covers may be placed over the outer bowl and fixedly or removably attached thereto. Such filter covers may provide a predetermined purity of the filtered mixture.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

I claim:

1. A ladle for filtering a mixture with undesirable components, and obtaining an essentially filtered mixture by separating the undesirable components, substantially remaining in the mixture, while the filtered mixture is substantially collected in the ladle, said ladle comprising:
   an outer bowl including a number of outer holes provided in a bottom region and/or in a middle region thereof, said outer bowl defines an outer upper region and an outer upper edge thereof;
   a handle attached to the outer bowl;
   an inner bowl disposed within the outer bowl so that a predetermined gap is provided therebetween, said inner bowl defines an inner upper region and an inner upper edge thereof, said inner bowl includes a number of inner holes provided in the inner upper region, disposed below the outer upper edge and above the outer holes; and
   wherein all the inner holes in the inner bowl are above all of the outer holes in the outer bowl; and
   a number of holders joining the outer bowl in the outer upper region and the inner bowl in the inner upper region during operation of said ladle.

2. The ladle according to claim 1, wherein said holders are spring-loaded brackets or latches, positioned over the outer upper edge and the inner upper edge, thereby providing for a removable attachment of the inner bowl to the outer bowl.

3. The ladle according to claim 1, wherein said holders are rivets or screws.

4. The ladle according to claim 1, wherein the inner bowl is provided with an inner outlet spout disposed in the inner upper region and the outer bowl is provided with an outer outlet spout disposed in the outer upper region coaxially with the inner outlet spout, to ease pouring out the filtered mixture from the ladle.

5. A ladle for filtering a mixture with undesirable components, and obtaining an essentially filtered mixture by separating the undesirable components, substantially remaining in the mixture, while the filtered mixture is substantially collected in the ladle, said ladle comprising:
   an outer bowl including a number of outer holes provided in a bottom region and/or in a middle region thereof, said outer bowl defines an outer upper region and an outer upper edge of the outer bowl;
   a handle attached to the outer bowl; an inner bowl disposed within the outer bowl so that a predetermined gap is provided therebetween, said inner bowl defines an inner upper region and an inner upper edge of the inner bowl;
   said inner bowl includes a number of protrusions respectively separated by a number of grooves provided in the inner upper region, said grooves are disposed below the outer upper edge of said outer bowl and above all the outer holes of said outer bowl; and
   at least some of the protrusions are provided with holders joining the outer bowl, in the outer upper region, with the inner bowl, in the inner upper region, during operation of said ladle.

6. The ladle according to claim 5, wherein said holders are spring-loaded brackets or latches, positioned over the outer upper edge and the inner upper edge, thereby providing for a removable attachment of the inner bowl to the outer bowl.

7. The ladle, according to claim 5, wherein said holders are rivets or screws.

8. The ladle according to claim 5, wherein the inner bowl is provided with an inner outlet spout conjugated with one of the grooves and the outer bowl is provided with an outer outlet spout disposed in the outer upper region coaxially with the inner outlet spout, to ease pouring out the filtered mixture from the ladle.

* * * * *